(12) United States Patent
Chung (10) Patent No.: US 8,522,245 B2
(45) Date of Patent: Aug. 27, 2013

(54) THREAD CRITICALITY PREDICTOR (75) Inventor: Jaewoong Chung, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 262 days.

(21) Appl. No.: 12/892,319

(22) Filed: Sep. 28, 2010

(65) Prior Publication Data

US 2012/0079491 A1 Mar. 29, 2012

(51) Int. Cl.
*G06F 9/46* (2006.01)

(52) U.S. Cl.
USPC .......................................... 718/103; 718/102

(58) Field of Classification Search
None
See application file for complete search history.

(56) References Cited

U.S. PATENT DOCUMENTS

| | | | |
|---|---|---|---|
| 2009/0204764 A1* | 8/2009 | Larson et al. | 711/125 |
| 2010/0185882 A1* | 7/2010 | Arnold et al. | 713/320 |

OTHER PUBLICATIONS

Abhishek Bhattacharjee et al.( "Thread Criticality Predictors for Dynamic Performance, Power, and Resource Management in Chip Multiprocessors," Department of Electrical Engineering, Princeton University, 2009, 12 page).*
Qiong Cai et al. ("Meeting Points: Using Thread Criticality to Adapt Multicore Hardware to Parallel Regions," United States Naval Academy, Annapolis, Maryland, 2008, 10 page).*
Daniel A. Jimemez ("Dynamic Branch Prediction with Perceptrons," Department of Computer Science, University of Texas, 2001, 10 page).*

Haitham Akkary et al., "Perceptron-Based Branch Confidence Estimation," Tenth International Symposium on High Performance Computer Architecture, Madrid, Spain, Feb. 14-18, 2004, 10 pages.
Pierre Salverda et al., "A Criticality Analysis of Clustering in Superscalar Processors," Department of Computer Science, University of Illinois, 2005, pp. 1-12.
Daniel A. Jimenez et al., "Dynamic Branch Prediction with Perceptrons," Department of Computer Science, University of Texas, 2001, 10 pages.
Brian Fields et al., "Focusing Processor Policies via Critical-Path Prediction," Computer Sciences Department, University of Wisconsin, 2001, pp. 1-12.
www.threadingbuildingblocks.org, Intel Threading Building Blocks 3.0 for Open Source, Sep. 28, 2010.
Qiong Cai et al., "Meeting Points: Using Thread Criticality to Adapt Multicore Hardware to Parallel Regions," United States Naval Academy, Annapolis, Maryland, 2008, 10 pages.
Abhishek Bhattacharjee et al., "Thread Criticality Predictors for Dynamic Performance, Power, and Resource Management in Chip Multiprocessors," Department of Electrical Engineering, Princeton University, 2009, 12 pages.
Prof. Sergio A. Alvarez, "CS345, Machine Learning Training Perceptrons using Gradient Descent Search," Computer Science Department, Boston College, date unknown, pp. 1-3, http://cs.bc.edu/~alvarez/ML/, CS 345, Fall 2008.

* cited by examiner

*Primary Examiner* — Emerson Puente
*Assistant Examiner* — Sisley Kim (57) ABSTRACT

Each thread of a multi-threaded application is assigned a ranking, referred to as thread criticality, based on the amount of time the thread is expected to take to complete one or more operations associated with the thread. More resources are assigned to threads having a higher thread criticality, in order to increase the rate at which the thread completes its operations. Thread criticality is determined using a perceptron model, whereby the thread criticality for a thread is a weighted sum of a set of data processing device performance characteristics associated with the thread, such as the number of instruction cache misses and data cache misses experienced by the thread. The weights of the perceptron model can be repeatedly adjusted over time based on repeated measurements that indicate the relative speed with which each thread is completing its operations.

18 Claims, 4 Drawing Sheets

THREAD CRITICALITY PREDICTOR

BACKGROUND

1. Field of the Disclosure

The present disclosure generally relates to data processing devices, and more particularly to thread management for data processing devices.

2. Description of the Related Art

To improve the efficiency of execution for a multi-threaded application, a data processing device can employ thread-level parallelism, whereby different processor cores of the data processing device concurrently execute different threads of the multi-threaded application. During execution, load imbalances, such as a disparity between the number of cache accesses associated with each concurrently executing thread, can cause the concurrently executing threads to complete operations at disparate rates. Because of interaction between threads, the disparity can cause faster-operating threads to become idle as they await the completion of operations by slower-operating threads. In addition, the disparity between the rates of thread operation can vary over time for a multi-threaded application and can also vary based on the architecture of the data processing device.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-5 illustrate devices and techniques to reduce the disparity in the rate of operation for concurrently executing threads of a multi-threaded application by assigning resources of a data processing device on a per-thread basis, based on the predicted rate of operation for each thread. To illustrate, each thread of a multi-threaded application is assigned a ranking, referred to as thread criticality, based on the amount of time the thread is expected to take to complete one or more operations associated with the thread. More resources are assigned to threads having a higher thread criticality, in order to increase the rate at which the thread completes its operations. Thread criticality is determined using a perceptron model, whereby the thread criticality for a thread is a weighted sum of a set of data processing device performance characteristics associated with the thread, such as the number of instruction cache misses and data cache misses experienced by the thread. The weights of the perceptron model can be repeatedly adjusted over time based on repeated measurements that indicate the relative speed with which each thread is completing its operations. As the weights are adjusted, the thread criticality for each thread is also adjusted, and the resources assigned to execute each thread modified based on the adjusted criticality values. The assignment of resources is thereby adapted over time, based both on the particular multi-threaded application being executed and on the architecture of the data processing device.

Figure 1:
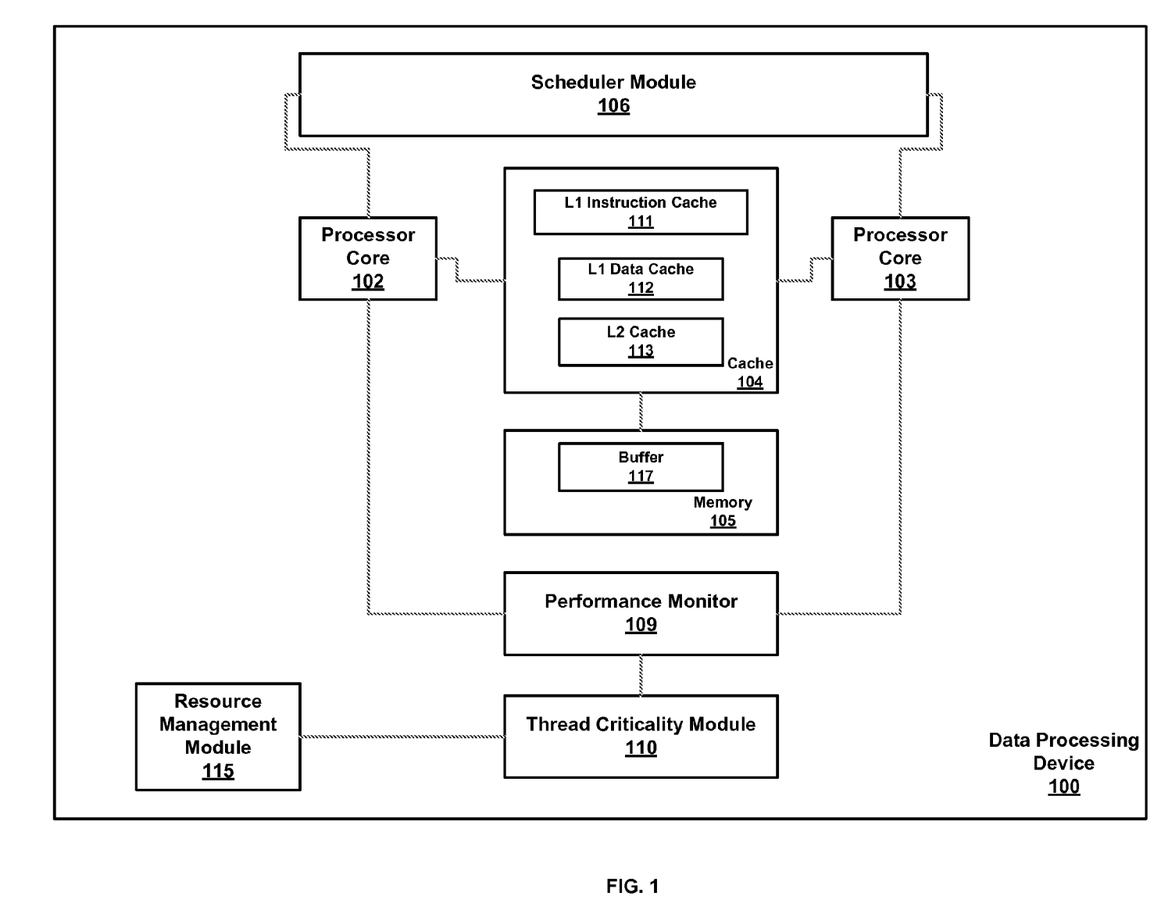
FIG. 1 is block diagram illustrating a data processing device in accordance with a specific embodiment of the present disclosure.

FIG. 1 illustrates a block diagram of a data processing device 100 in accordance with one embodiment of the present disclosure. Data processing device 100 includes modules such as processor cores (e.g. processor cores 102 and 103), caches (e.g. cache 104), memory (e.g. memory 105), scheduler module 106, thread criticality module 110, resource management module 115, and performance monitor 118.

Each of the processor cores 102 and 103 includes an instruction pipeline (not shown) configured to execute instructions. In particular, each of the processor cores 102 and 103 is configured to receive instructions associated with a different thread of a multi-threaded application, and to perform operations as indicated by the corresponding thread instructions. Further, each of the processor cores 102 and 103 is configured to execute instructions of a designated thread concurrently with execution of a thread at the other processor core, thereby providing thread-level parallelism for a multi-threaded application. It will be appreciated that although two processor cores are illustrated in FIG. 1, the techniques described herein are applicable to data processing devices having more than two processor cores.

The threads executed at the processor cores 102 and 103 are determined by the scheduler module 106. To illustrate, in response to a power-on or reset indication, the data processing device 100 can execute an operating system application to control the interaction of other applications with the data processing device 100. The operating system, among other functions, manages the execution of applications by scheduling the sequence in which the applications are executed. The scheduling module 106 enforces the schedule, as set by the operating system, by assigning which thread is to be executed at each processor core.

Cache 104 represents a set of caches, whereby each cache in the set is associated with a particular cache level and type of data. Thus, in the illustrated embodiment, cache 104 includes a level 1 (L1) data cache 111, an L1 instruction cache 112, and a shared level 2 (L2) instruction/data cache 113. The caches 111-113 are shared by the processor cores 102 and 103 for storing instructions and data, whereby each cache location of the caches 111-113 is configurable to be assigned to one of the two cores for exclusive access. During execution of threads at the processor cores 102 and 103, the processor cores can access the respective assigned locations of the caches 111-113 to store and retrieve instructions and data according to the operations indicated by thread instructions. It will be appreciated that the techniques described herein are applicable to cache configurations other than the example configuration illustrated at FIG. 1.

Memory 105 includes one or more types of memory (e.g. random access memory (RAM), non-volatile memory, or a combination thereof) that are configured to store and retrieve information in response to access operations (write accesses and read accesses, respectively). In the embodiment of FIG. 1, each access operation includes a priority indicator (not shown) for the operation, and the memory 105 resolves a set of access operations in a priority order based at least in part on the priority indicators for the access operations in the set.

The data processing device 100 employs the thread criticality module 110 and resource management module 115 to modify the processor resources assigned to execute the operations of each thread on a per-thread basis according to the thread criticality of each thread being executed. As used herein, a processor resource is any aspect of the data processing device that can be modified in order to increase or reduce the speed at which the operations of a thread are executed relative to other executing threads. As described further below, thread criticality module 110 determines the thread criticality for each thread, and resource management module 115 modifies the processor resources assigned for execution of each thread according to the thread criticality.

For example, each of the processor cores 102 and 103 can be supplied with an individual adjustable voltage that provides power for the logic modules of the respective processor core, and the speed with which the processor core executes instructions varies directly with the magnitude of the supplied voltage. Resource management module 115 can individually control the voltage regulators that supply the adjustable voltages for the processor cores. For a thread with relatively high thread criticality, resource management module 115 can assign additional processor resources by increasing the voltage provided to a processor core executing the thread, thereby increasing the speed of execution for the thread.

Further, resource management module 115 can adjust the number of cache locations at the cache 104 that are assigned to a processor core based on thread criticality. In particular, the caches 111-113 can be accessed more quickly than the memory 105. Accordingly, for a thread with relatively high thread criticality, resource management module 115 can assign additional processor resources by allocating relatively more cache locations for exclusive access by the processor core, thereby increasing the speed with which the thread can access information.

In addition, resource management module 115 can assign processor resources by adjusting the priority with which the memory 105 schedules handling of access operations on a per-thread basis, such that access operations from a thread having a higher priority are handled before access operations from threads having a lower priority. By adjusting the relative priority of access operations from the threads according to thread criticality, resource management module 115 can increase the speed at which more critical threads are executed.

To determine the thread criticality for each thread, the data processing device 100 employs a performance monitor 109 that is configured to monitor performance characteristics associated with execution of threads at the processor cores 102 and 103. In particular, the performance monitor 109 includes a set of performance registers, whereby each performance register records information indicative of an aspect of execution of a thread. For example, performance monitor 109 can record, on a per-thread basis, information indicating the amount of time a thread takes to execute operations between barrier points, information indicating the number of hits and misses associated with each L1 cache, information indicating the number of hits and misses associated with the L2 cache 113, information indicating the number of times memory 105 is accessed, and other performance information.

Thread criticality module 125 determines the thread criticality for each executing thread based on the performance characteristics associated with each thread. Thread criticality module 125 employs a perceptron-based model to determine thread criticality, where the perceptron is defined by the following formula:

$$TC = \sum_{n=1}^{N} W_n * PC_n$$

where TC is the thread criticality for a thread, W is a set of weights, PC is the set of performance characteristics, and N is the integer number of performance characteristics in the set PC. Accordingly, TC represents a weighted sum of the performance characteristics set PC based on the set of weights W.

In an embodiment, the thread criticality module employs the following performance characteristics for the set PC: the number of L1 instruction cache misses by the thread (L1 instruction cache misses), the number of L1 data cache misses by the thread (L1 data cache misses), the number of L2 cache misses by the thread (L2 cache misses), and the number of memory buffer misses, described further below. Thus, thread criticality can be expressed as follows:

$TC = W_1*L1$ instruction cache misses$+W_2*L1$ data cache misses$+W_3*L2$ cache misses$+W_4*$memory buffer misses With respect to the memory buffer misses parameter, the memory 105 includes a buffer 117 that stores information associated with recent read and write accesses. For example, the buffer 117 stores information that has been retrieved from main memory to satisfy recent read accesses and stores information to be written to main memory to satisfy recent write accesses. The buffer 117 is employed as an internal cache for read and write accesses to the memory 105. Accordingly, if information associated with an access is not stored in the buffer 117, a memory buffer miss results, and the memory 105 retrieves the information from main memory and stores it in the buffer 117.

In an embodiment, the initial weight values for the set W are based on the amount of time it is expected to take to address a miss in the respective cache or buffer. Thus, for example, the initial value for $W_1$ is the amount of time to move information from the L2 cache 113 to an L1 cache (L2 cache hit time), the initial value of $W_2$ is also the L2 cache hit time, the initial value of $W_3$ is the average hop count to memory controllers of the memory 105*per-link delay+the length of a memory cycle for the memory 105*the average of memory 105 read latency and write latency in memory cycles, and the initial value of $W_4$ is the amount of time from activation of the memory 105 to initiating a read or write access+the memory precharge period for the memory 105.

The value TC for a thread represents a predicted thread criticality for the thread, and can differ from the actual thread criticality. That is, the operations of a thread may complete relatively more or less quickly than would be indicated by the value TC. In order to improve the accuracy of the predicted thread criticality over time, the thread criticality module 110 can adjust the set of weights W at periodic intervals based on the measured criticality of each thread. In an embodiment, the set of weights are adjusted using a gradient descent technique to determine the local minimum of a function of the weights, where the function is the mean squared error between the predicted criticality of the thread and the measured criticality of the thread. The adjustment of each weight can thus be expressed as follows:

$W_n(\text{new}) = W_n(\text{old}) - \alpha*(\text{predicted criticality value}*\text{actual criticality value})*PC_n$ where the predicted criticality value is the value TC for the thread and the value a is a learning factor value that determines the relative amount of adjustment in the weight. The value α can be determined based on a number of factors, including how often the set of weights is adjusted and the architecture of the processor device 102. Accordingly, the value α can be determined empirically for a particular processor architecture.

The actual criticality value is the measured thread criticality of the thread. In one embodiment, the measured criticality value is determined based on the amount of time each thread takes between barrier points. This can be better understood with reference to FIG. 2, which illustrates instructions 250, associated with a first thread (referred to as Thread1) and instructions 251, associated with a second thread (referred to as Thread2). In the illustrated embodiment, instructions 250 include barrier instructions 255 and 256, while instructions 251 include barrier instructions 257 and 258. At each barrier instruction, the corresponding thread suspends execution until it receives an indication that the other thread has reached a corresponding barrier instruction. In the illustrated embodiment, it is assumed that barrier instruction 255 corresponds to barrier instruction 257 and barrier instruction 256 corresponds to barrier instruction 258.

Figure 2:
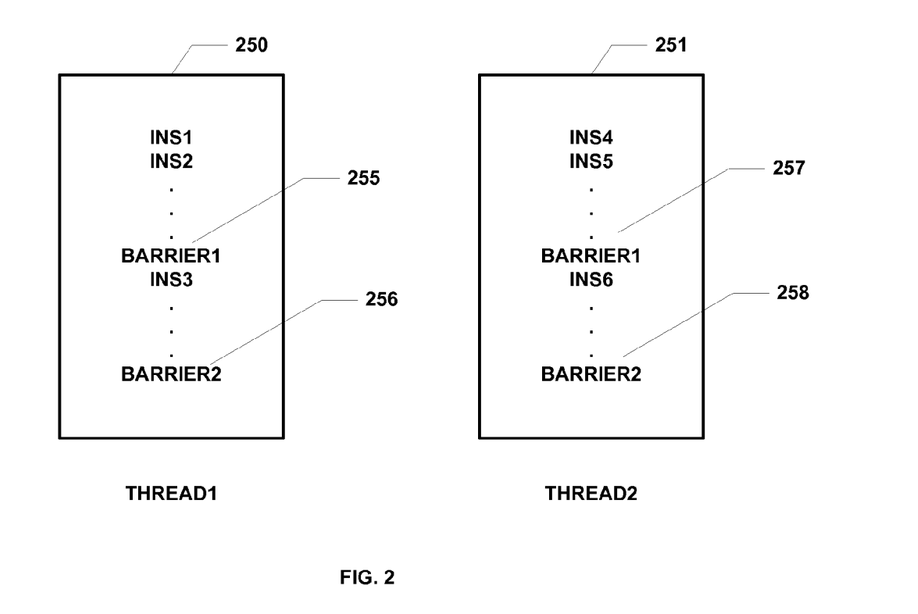
FIG. 2 is a diagram of thread instructions in accordance with one embodiment of the present disclosure.
Figure 3:
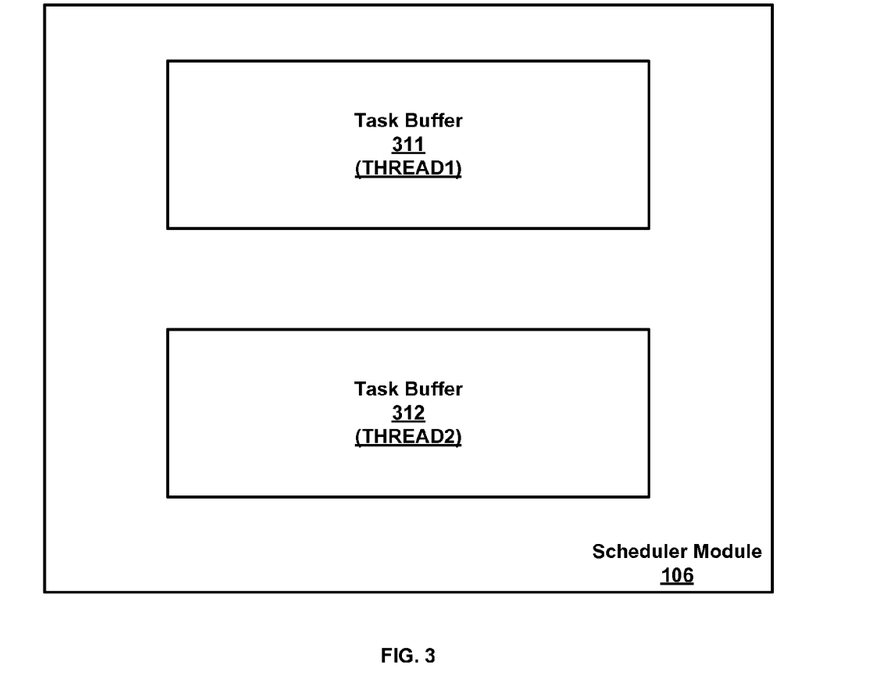
FIG. 3 is a block diagram of the scheduler module of FIG. 1 in accordance with one embodiment of the present disclosure.

During operation, performance monitor 109 can determine and record the amount of time that Thread1 takes to execute the instructions between barrier instruction 255 and 256. Similarly performance monitor 109 can determine and record the amount of time that Thread2 takes to execute the instructions between barrier instruction 257 and 257. These values represent the actual criticality values for Thread1 and Thread2, respectively.

In another embodiment, the actual criticality value for each thread can be based on the amount of time each thread takes to retrieve tasks from a task buffer. This can be better understood with reference to FIG. 3, which illustrates a particular embodiment of a portion of scheduler module 106. In the illustrated embodiment, scheduler module 106 includes a task buffer 311, associated with a thread referred to as Thread1, and a task buffer 312, associated with a thread referred to as Thread2. Each task buffer stores task identifiers for tasks assigned to the associated thread. As a thread completes a task it retrieves the next task from the buffer. Performance recorder 110 can measure the amount of time each thread takes between retrieving tasks from the respective buffer. The measured amount of time represents the actual criticality for the respective thread.

Referring again to FIG. 1, in operation the thread criticality module 110 determines an initial thread criticality for each thread scheduled for execution by scheduler module 106 based on initial weight values. Based on the initial weight values, resource management module 115 assigns resources of the processor for each executing thread. The thread criticality module 110 can periodically modify the weight values for each thread based on measured actual criticality values, and also periodically adjust the thread criticality values for each thread. Further, in response to an adjustment in the thread criticality values, the resource allocation module can modify the amount of resources allocated to each thread. These operations can be better understood with reference to FIG. 4, which illustrates a flow diagram of method of allocating resources of the processor device 102 in accordance with one embodiment of the present disclosure.

Figure 4:
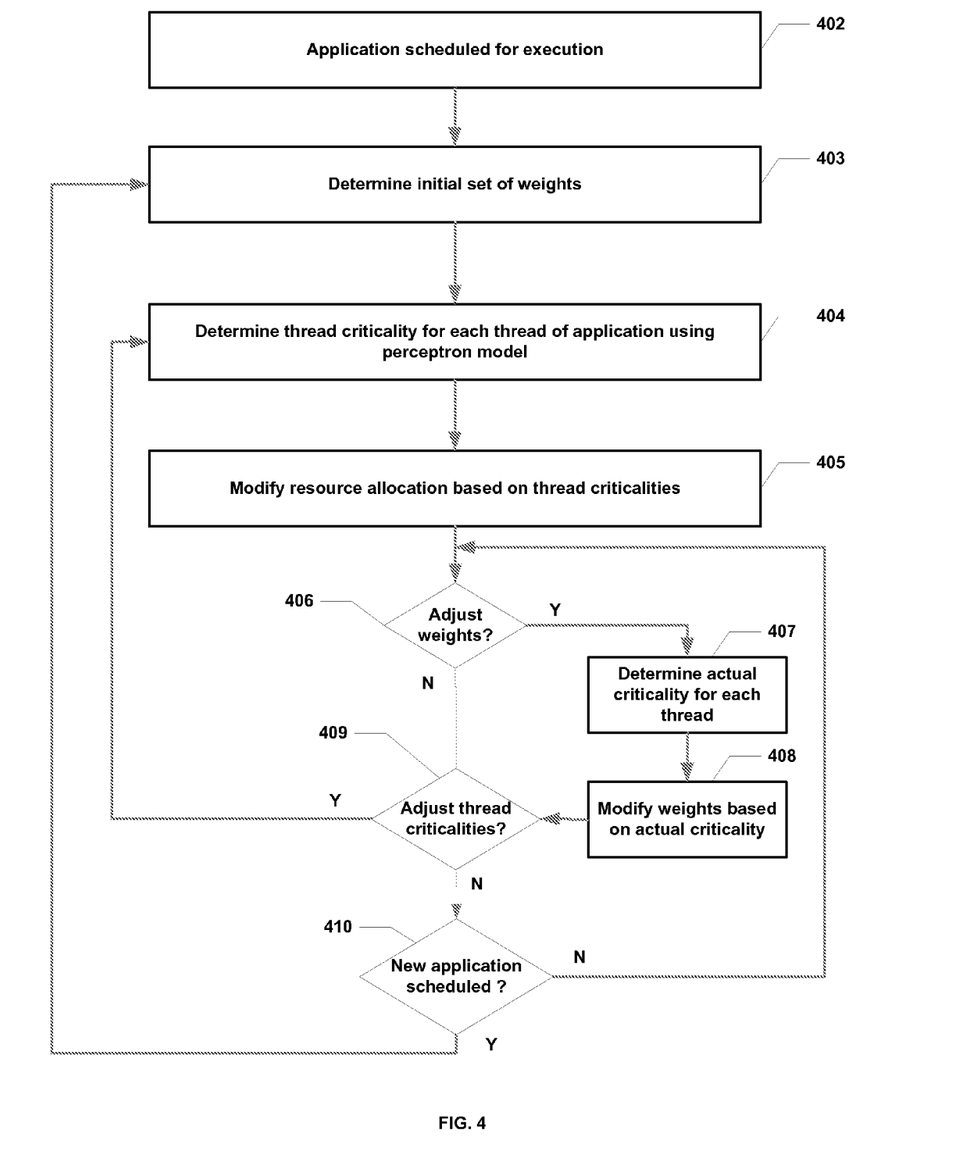
FIG. 4 is a flow diagram of a method of determining thread criticality in accordance with one embodiment of the present disclosure.

Referring to FIG. 4, at block 402 an application is scheduled for execution at the processor cores 102 and 103 by the scheduler module 106. At block 403, an initial set of weights are determined by the thread criticality module 110. The initial set of weights can be a defined set of values, such as the values described above, or can be the most recent set of weights used to determine thread criticality for the application. At block 404, the thread criticality module 110 determines thread criticality values for each thread using the weighted sum formula described above. In particular, the thread criticality module 110 retrieves performance characteristics from the performance monitor 109 to determine the set of inputs PC for the thread criticality calculations. At block 405, the resource management module 115 modifies the resources assigned to each thread based on the thread criticality for each thread. To illustrate, threads having higher thread criticality are assigned more resources than threads having lower thread criticality. At block 406, the thread criticality module 110 determines whether the weight values are to be adjusted. In an embodiment, the thread criticality module 110 includes a timer with a programmable threshold, whereby the timer triggers adjustment of the weight values when the timer reaches the threshold, whereupon the timer is reset.

In response to determining that the weight values are to be adjusted, at block 407 the thread criticality module 110 determines a current actual criticality for each thread. At block 408, the thread criticality module 110 adjusts the set of weights using the actual criticality value for the thread having the highest thread criticality and stores the set of weights. Accordingly, in the illustrated embodiment, only one set of weights is stored and used for all threads of an application. In other embodiments, individual sets of weights for each thread can be calculated and stored.

At block 409, the thread criticality module 110 determines if it is time to recalculate thread criticality values. In an embodiment, the thread criticality values are recalculated each time the set of weights for the application are adjusted. In another embodiment, the thread criticality module 110 can employ a timer to determine the period of calculation for the thread criticality values. Accordingly, the thread criticality values can be determined according to a different period than the adjustment of the weight values. In response to determining it is time to recalculate the thread criticality values, the method flow proceeds to block 411, where the thread criticality values are recalculated according to the stored set of weights. The method flow then returns to block 405, where the resources allocated to each thread are modified based on the recalculated values.

At block 410, the scheduler module 106 determines whether a new application is scheduled for execution. If so, the method returns to block 403 to determine thread criticality for each thread of the new application.

Referring again to FIG. 1, the thread criticality module 110 can be implemented as software, hardware, or a combination thereof. For example, in one embodiment an operating system of the data processing device 102 can perform the operations of the thread criticality module 110. In another embodiment a state machine is employed to determine the thread criticality values. This can be better understood with reference to FIG. 5, which illustrates a particular embodiment of the thread criticality module. In the illustrated embodiment of FIG. 5, the thread criticality module includes a state machine 530, a perceptron command register (PCR) 540, a perceptron weight table (PWT) 550, and thread criticality registers 532.

Figure 5:
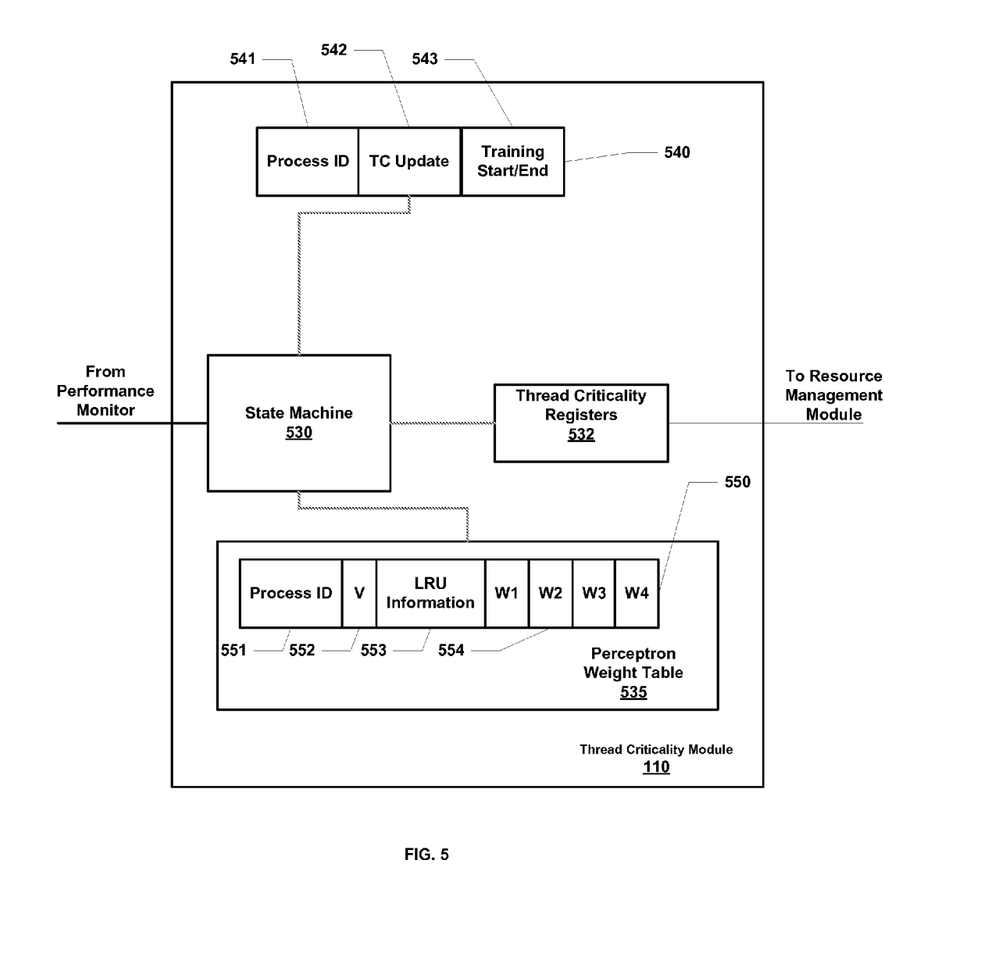
FIG. 5 is a block diagram of the thread criticality module of FIG. 1 in accordance with one embodiment of the present disclosure.

The PCR 540 includes a number of fields, including a process ID field 541 that identifies an application, a thread criticality update field 542, and a training control field 543. The state machine 530 is configured to adjust the set of weights and to calculate the thread criticality values for an application based on values stored at the PCR 540. To illustrate, the operating system or other application can start and terminate a training session by writing specified start and stop values, respectively, to PCR 540. In response to these values, state machine 530 can access the performance monitor 109 to determine performance information associated with the time period of the training session, including actual criticality values for each weight. In response to termination of the training session, the state machine 530 can adjust the set of weights based on the actual criticality values, and store the updated weights at PWT 550. In addition, in response to a specified value being written to the thread criticality update field 542, the state machine 530 can recalculate the thread criticality values for each thread of the application indicated by the process ID field 541, based on the set of weights associated with the application and stored at the PWT 550. The recalculated values can be stored at the thread criticality registers 532. The thread criticality registers can be accessed by the resource management module 115 to modify the processor resources allocated to each thread.

The PWT 550 includes a number of entries (e.g. entry 515), where each entry stores the weights for an application. In the illustrated embodiment, entry 515 includes a process ID field 551, a validity field 552, a least-recently-used (LRU) information field 553, and weight fields 554. The process ID field 551 identifies an application that is executing or has executed at one of the processor cores 102 and 103. The weight fields 554 store the weights for the application identified by the process ID field 551. In the illustrated embodiment, a single set of weights is stored per process, with the single set of weights used to calculate the thread criticalities for all threads of the application identified by the process ID field 551. The validity field 552 indicates whether the entry 515 has been superseded by a more recently stored entry associated with the application identified by the process ID field 551. The LRU information field 553 stores information indicating when the entry 550 was most recently accessed. Accordingly the validity field 552 and the LRU information field 553 can be employed by a cache controller (not shown) to replace entries of the PWT 550 according to a conventional pseudo-LRU policy.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
   determining a weighted sum of a first set of performance characteristics associated with execution of a first thread at a data processing device based on a first set of adjustable weights, the weighted sum of the first set of performance characteristics indicating a first thread criticality;
   modifying resources of the data processing device assigned for execution of the first thread based on the first thread criticality;
   determining a measured criticality based on execution of the first thread;
   adjusting the first set of adjustable weights based on the measured criticality to determine a second set of weights by adjusting a first weight of the first set of adjustable weights based on a difference between the first thread criticality and the measured criticality;
   determining a second set of performance characteristics associated with execution of the first thread at the data processing device;
   determining a weighted sum of the second set of performance characteristics based on the second set of weights, the weighted sum of the second set of performance characterisitics indicating a second thread criticality; and
   modifying resources of the data processing device assigned for execution of the first thread based on the second thread criticality.

2. The method of claim 1, wherein determining the weighted sum comprises determining the weighted sum based on a perceptron model that uses the first set of weights.

3. The method of claim 1, wherein determining the measured criticality comprises:
   determining a first amount of time associated with the first thread reaching a set of thread barriers;
   determining a second amount of time associated with a second thread reaching the set of thread barriers; and
   determining the measured criticality based on the first amount of time and the second amount of time.

4. The method of claim 1, wherein determining the measured criticality comprises:
   determining a first amount of time for the first thread to select a first task from a set of task buffers;
   determining a second amount of time for a second thread to select a second task from the set of task buffers; and
   determining the measured criticality based on the first amount of time and the second amount of time.

5. The method of claim 1, wherein adjusting the first set of adjustable weights comprises:
   determining a first product of the difference between the first thread criticality and the measured criticality and a training factor;
   determining a second product of the first product and a first performance characteristic of the data processing device; and
   adjusting a first weight of the first set of adjustable weights based on a difference between the first weight and the second product.

6. The method of claim 5, wherein adjusting the first set of adjustable weights comprises:
   determining a third product of the difference between a second thread criticality and the measured criticality and the training factor;
   determining a fourth product of the third product and a second performance characteristic of the data processing device; and
   adjusting a second weight of the first set of adjustable weights based on a difference between the second weight and the fourth product.

7. The method of claim 1, further comprising:
   periodically adjusting the first set of adjustable weights based on execution of threads at the data processing device;

periodically determining the weighted sum of the first set of performance characteristics based on the first set of adjustable weights; and periodically modifying resources of the data processing device assigned for execution of the first thread based on the weighted sum.

8. The method of claim 1, further comprising:

determining a second set of performance characteristics associated with execution of a second thread at the data processing device;

determining a weighted sum of the second set of performance characteristics based on a second set of weights, the weighted sum of the second set of performance characteristics indicating a second thread criticality; and modifying resources of the data processing device for execution of the second thread based on the second thread criticality.

9. The method of claim 1, wherein modifying resources of the data processing device comprises modifying a voltage supplied to a processor core of the data processing device.

10. The method of claim 1, wherein modifying resources of the data processing device comprises modifying an amount of cache space allocated to the first thread.

11. The method of claim 1, wherein modifying resources of the data processing device comprises modifying a priority of memory requests associated with the first thread.

12. A non-transitory computer readable medium storing a program of instructions to manipulate a processor, the instructions comprising instructions to:

determine a weighted sum of a first set of performance characteristics associated with execution of a first thread at a data processing device based on a first set of adjustable weights, the weighted sum of the first set of performance characteristics indicating a first thread criticality;

modify resources of the data processing device assigned for execution of the first thread based on the first thread criticality;

determine a measured criticality based on execution of the first thread;

adjust the first set of adjustable weights based on the measured criticality to determine a second set of weights by adjusting a first weight of the first set of adjustable weights based on a difference between the first thread criticality and the measured criticality;

determine a second set of performance characteristics associated with execution of the first thread at the data processing device;

determine a weighted sum of the second set of performance characteristics based on the second set of weights, the weighted sum of the second set of performance characterisitics indicating a second thread criticality; and modify resources of the data processing device for execution of the first thread based on the second thread criticality.

13. The non-transitory computer readable medium of claim 12, wherein the instructions to determine the measured criticality comprise instructions to:

determine a first amount of time associated with the first thread reaching a thread barrier;

determine a second amount of time associated with a second thread reaching the thread barrier; and determine the measured criticality based on the first amount of time and the second amount of time.

14. The non-transitory computer readable medium of claim 12, the instructions to determine the measured criticality comprise instructions to:

determining a first amount of time for the first thread to select a first task;

determine a second amount of time for a second thread to select a second thread; and determine the measured criticality based on the first amount of time and the second amount of time.

15. A data processing device, comprising:

a first control module to determine a weighted sum of a first set of performance characteristics associated with execution of a thread at the data processing device based on a first set of adjustable weights;

a second control module to modify resources of the data processing device for execution of the thread based on the weighted sum of the first set of performance characteristics;

the first control module to:

determine a measured criticality based on execution of the thread;

adjust the first set of adjustable weights based on the measured criticality to determine a second set of weights by adjusting a weight of the first set of adjustable weights based on a difference between the weighted sum of the first set of performance characteristics and the measured criticality;

determine a second set of performance characteristics associated with execution of the thread at the data processing device;

determine a weighted sum of the second set of performance characteristic based on the second set of weights; and wherein the second control module is to modify resources of the data processing device allocated for execution of the thread based on the weighted sum of the second set of performance characteristics.

16. The data processing device of claim 15, wherein the second control module is to modify a voltage supplied to a processor core of the data processing device.

17. The data processing device of claim 15, wherein the second control module is to modify an amount of cache space allocated to the thread.

18. The data processing device of claim 15, wherein the second control module is to modify a priority of memory requests associated with the thread.

* * * * *

UNITED STATES PATENT AND TRADEMARK OFFICE
CERTIFICATE OF CORRECTION

| | |
|---|---|
| PATENT NO. | : 8,522,245 B2 |
| APPLICATION NO. | : 12/892319 |
| DATED | : August 27, 2013 |
| INVENTOR(S) | : Jaewoong Chung |

It is certified that error appears in the above-identified patent and that said Letters Patent is hereby corrected as shown below:

In the Claims:

Column 10, Line 10, please change "12, the instructions to determine the measured criticality comprise instructions to:" to -- 12, wherein the instructions to determine the measured criticality comprise instructions to: --

Column 10, Lines 40-41, please change "performance characteristic based on the second set of weights; and" to -- performance characteristics based on the second set of weights; and --

Signed and Sealed this
Eighteenth Day of March, 2014

Michelle K. Lee
*Deputy Director of the United States Patent and Trademark Office*